United States Patent
Bagaveyev (10) Patent No.: US 10,871,127 B2
(45) Date of Patent: Dec. 22, 2020

(54) EXTENDED EXPANDER CYCLE SYSTEM

(71) Applicant: Nadir T Bagaveyev, Pacifica, CA (US)

(72) Inventor: Nadir T Bagaveyev, Pacifica, CA (US)

(*) Notice: Subject to any disclaimer, the term of this patent is extended or adjusted under 35 U.S.C. 154(b) by 228 days.

(21) Appl. No.: 16/040,377

(22) Filed: Jul. 19, 2018

(65) Prior Publication Data
US 2019/0072053 A1 Mar. 7, 2019

Related U.S. Application Data (60) Provisional application No. 62/553,785, filed on Sep. 1, 2017.

(51) Int. Cl.
| | |
|---|---|
| *F02K 9/48* | (2006.01) |
| *F02K 9/64* | (2006.01) |
| *F02C 7/22* | (2006.01) |
| *F02K 9/46* | (2006.01) |
| *F02C 7/224* | (2006.01) |

(52) U.S. Cl.
CPC ............... *F02K 9/48* (2013.01); *F02C 7/22* (2013.01); *F02C 7/222* (2013.01); *F02C 7/224* (2013.01); *F02K 9/46* (2013.01); *F02K 9/64* (2013.01)

(58) Field of Classification Search
CPC ..... F02K 9/48; F02K 9/46; F02K 9/64; F02C 7/222; F02C 7/224; F02C 7/236; F23R 3/286
See application file for complete search history.

(56) References Cited

U.S. PATENT DOCUMENTS

| | | | | |
|---|---|---|---|---|
| 3,286,469 A | * | 11/1966 | Atherton | ........... F02K 9/97 60/224 |
| 4,073,138 A | * | 2/1978 | Beichel | ........... F02K 9/48 60/245 |
| 4,583,362 A | * | 4/1986 | Wagner | ........... F02K 9/48 60/259 |
| 5,224,339 A | | 7/1993 | Hayes | |
| 6,397,577 B1 | | 6/2002 | Sondergaard | |
| 6,430,917 B1 | | 8/2002 | Platts | |
| 7,074,016 B1 | | 7/2006 | Epstein | |
| 7,219,490 B2 | | 5/2007 | Dev | |
| 7,934,368 B2 | | 5/2011 | Muller | |

FOREIGN PATENT DOCUMENTS

DE   102011113784   6/2013

* cited by examiner

*Primary Examiner* — Steven M Sutherland
*Assistant Examiner* — Thuyhang N Nguyen
(74) *Attorney, Agent, or Firm* — Gulick Law; Karima Gulick (57) ABSTRACT

An extended expander cycle system comprising a rocket engine having a plurality of channels; a plurality of fuel supplied one-wheel-turbopumps; a plurality of oxidizer supplied one-wheel-turbopumps; wherein utilization of the plurality of channels for both fuel and oxidizer and utilization of plurality of fuel and oxidizer supplied one-wheel-turbopumps provides adequate energy for fuel and oxidizer pressurization.

11 Claims, 6 Drawing Sheets

EXTENDED EXPANDER CYCLE SYSTEM

CROSS REFERENCE TO RELATED APPLICATIONS

The present application claims benefit of U.S. Provisional Application. No. 62/553,785 filed Sep. 1, 2017, titled EXTENDED EXPANDER CYCLE SYSTEM.

The entire content of 62/553,785 is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present disclosure relates generally to rocket engines and combustion cycles in general and more particularly to an extended expander cycle system including a one-wheel turbopump and a plurality of channels which provides adequate energy for fuel and oxidizer pressurization and allows both fuel and oxidizer to be heated in the same engine.

2. Description of the Related Art

In the art, an expander cycle rocket engine runs on a fuel/oxidizer propellant combination. The expander cycle is based upon the concept that the engine's turbomachinery is driven with gases warmed through regenerative cooling of the engine's thrust chamber assembly. In general, the fuel is heated before it is combusted, typically with waste heat from the main combustion chamber. The expander cycle is based upon the concept of driving the turbomachinery with gases warmed through regenerative cooling of the thrust chamber assembly, thereby eliminating the need for a secondary combustion zone.

The patent literature describes numerous expander cycles that are for rocket engines. For example, U.S. Pat. No. 7,418,814, deals with a dual expander cycle rocket engine with an intermediate, closed-cycle heat exchanger, U.S. Pat. No. 7,900,436, teaches a gas-generator augmented expander cycle rocket engine, and U.S. Pat. No. 4,589,253, deals with a pre-regenerated staged-combustion rocket engine. The expander cycle rocket engine has many inherent benefits over other typical cycles such as the standard gas-generator cycle, the tap-off cycle, or the staged combustion cycle.

The regular expander cycle known in the art has many benefits over other combustion cycles: it is simple, efficient, and a closed cycle with little to no damage to the engine, making it reusable. However, this cycle has a problem with scaling. In past designs, as the nozzle gets larger, the surface area increases with $R^2$, R being the radius of the nozzle, and the fuel volume increases with $R^3$. Therefore, in regular Expander cycles, as the nozzle gets bigger, the heat absorbed by unit of fuel increases, and the fuel used to cool the nozzle is not energetic enough to drive the turbine. In addition, other expander cycles and combustion cycles are limiting to the amount of heat that can be generated and limiting to the amount of energy for fuel and oxidizer pressurization. As will be disclosed below present invention solves the issues and limitations of the prior art by implementing an extended expander cycle system involving a variation of channel designs, a plurality of channels and innovative one-wheel turbopump designs and shaftless stackable one-wheel turbopumps. All cited prior art is hereby incorporated by reference.

SUMMARY OF THE INVENTION

In one aspect, the present disclosure is embodied in an extended expander cycle system including: a) a rocket engine with many cooling and heating channels, and b) many one-wheel-turbopumps to process fuel and oxidizer. The use of multiple of one-wheel-turbopumps and many channels allows for heating both gases or fluids in the same engine and creates adequate energy for fuel and oxidizer pressurization.

Various combinations of cooling and heating channels and one-wheel-turbopump designs can be applied to this technology.

In another aspect, the present disclosure is embodied as an extended expander cycle system including the processing of a low-pressure fuel and a low-pressure oxidizer through the pump part of the one-wheel-turbopump (also referred to throughout as a one-wheel turbopump or turbopump assembly) where the pressure is increased. The heated fuel and oxidizer are then processed through the plurality of heating and cooling channels (also referred to as plurality of channels) of the rocket engine. The fuel and oxidizer are then processed through the turbine part of the one-wheel turbopump where the pressure of the gases is further increased. Due to the plurality of one-wheel turbopumps and additional heat generated, additional rocket engine channels are required and used to provide adequate energy to the system.

Unlike the turbopumps known in the prior art, the present disclosure uses a one-wheel turbopump where the functions of turbine and pump are combined in one wheel instead of being separated by a shaft. These can be for used for impulse and/or reaction turbine, and for axial and/or centrifugal pumps. A seal separates the turbine section and turbine fluid from the pump section and pump fluid. The turbine can be inside or outside on the wheel. When the turbine is inside the wheel the pump is outside the wheel. When the turbine is outside the wheel, the pump is inside the wheel. The use of a one-wheel turbopump simplifies turbomachinery.

The planar design of the turbopumps and lack of a requirement of a shaft to separate the pump from the turbine components, in conjunction with securing means on the turbopump assemblies, allows the turbopumps to be stacked onto one another. In some embodiments, the one-wheel turbopumps are stacked vertically whereas in other embodiments, the one-wheel turbopumps are stacked horizontally or even diagonally. In some embodiments, multiple one-wheel-turbopumps can be attached via tubes or pipes, mechanically attached to one another or fluidly coupled. To handle the added heat and energy provided by the plurality of turbopumps, additional channels are required and used throughout the engine.

The rocket engine channels allow for an increased heated surface area. In some embodiments, the channels are inside and/or within the rocket engine chamber whereas in other embodiments, the channels are on the outer surface of the rocket engine or on the outer surface of the engine, within the engine walls and inside the engine walls or any combinations thereof. Heating and cooling channels can be added on the rocket engine walls, adjacent to the wall, on the inner wall or within the wall as internal channels. In certain embodiments, a combination of various heating and cooling channels is used. In other embodiments, the channels serve as heating and cooling channels, and can be in the shape of coils, straight channels, in wall channels and/or internal channels. In some embodiments, internal channels have an increased surface area in a direction extending from the rocket engine wall allowing an even more increased heated surface area. These protrusions can take various shapes and forms, can be radial and can vary in radius and size from one channel to the next.

An extended expander cycle comprises a fuel and oxidizer heated separately through a plurality of pumps from the one-wheel turbopumps. The fuel and oxidizer are then used by the turbine portion of the turbopump, and then heated through the rocket engine channels. The fuel and oxidizer can go through multiple cycles before finally entering the engine.

In certain embodiments, the rocket engine, one-wheel turbopumps and channels are 3D printed, allowing the channels to be built in the same engine as one part and allowing for a more detailed design.

In one embodiment of the one-wheel turbopump, the pump portion of the turbopump has a combination of an axial and a centrifugal pump. In another embodiment of the turbopump, the turbine portion of the turbopump has both an impulse and a reaction turbine, whereas in other embodiments, the pump can be either an axial or a centrifugal or both an axial and a centrifugal pump while the turbine can be either an impulse turbine, a reaction turbine or both and impulse and a reaction turbine. The one-wheel turbopump comprises an inlet and an outlet. In one embodiment, the gas and fluids in the turbines flow from bottom to top whereas the liquid goes the other way, while in other embodiments, the gas and fluids flow in the opposite direction. These fluids, liquids and gases can flow in any direction so long as they are counterflowing. 3D printing makes it easy to have the gas and liquid counterflowing.

In another aspect, the present disclosure is embodied in an extended expander cycle including a rocket engine having a plurality of channels; at least two one-wheel-turbopumps where a fuel and an oxidizer are received by the pump portion of the one-wheel-turbopump, pressured through the pump portion of the one-wheel turbopump, heated through a plurality of channels then transferred to the turbine portion of the one-wheel turbopumps. The plurality of channels provides adequate energy for the fuel and the oxidizer pressurization.

The one-wheel turbopumps can be used for the fuel and oxidizer. The same design and the same turbopump can be utilized for processing both fuel and oxidizer. In certain embodiments the one-wheel turbopump comprises a housing, a wheel mounted on the housing and can rotate on the housing, a pump structurally coupled to the wheel, a turbine structurally to the same wheel, and a seal separating the turbine from the pump. The turbopump also comprises an inlet and outlet for both the pump and turbine portions of the one-wheel turbopump.

In certain embodiments, the one-wheel turbopump has a securing means coupled to the housing adapted to secure the multiple fuel supplied one-wheel-turbopumps together. The pump can be a radial and/or centrifugal pump. Similarly, the turbine can be an impulse and/or a reaction turbine. In other embodiments, the one-wheel-turbopump also comprises guiding vanes and can be 3D printed on the turbopump.

In another aspect, the present disclosure is embodied in a method of operating an extended expander cycle system including the steps of pressurizing a fuel through a fuel pump, heating the fuel through a plurality of heating channels coupled to a rocket engine, processing the exhaust of the engine through a fuel turbine, and delivering the processed fuel back to the engine for heating and combustion. In the same engine, and oxidizer is heated through a pump, then said oxidizer is heated through the plurality of channels coupled to the rocket engine, the oxidizer then gets processed through an oxidizer turbine, and delivered to the engine for heating and combustion. Both fuel and oxidizer are heated in same engine.

In certain embodiments, the fuel and oxidizer are processed multiple times through the pump, plurality of channels and turbine before being received by the combustion chamber portion of the engine for combustion. In other embodiments, the heated fuel and oxidizer go through an engine cooling sleeve or a plurality of cooling channels after being first processed via the pump, and heating channels, and the exhaust of the cooling sleeve and/or cooling channels is what operates the turbines. Here the fuel and oxidizer pick up more energy through the turbine and the turbine processed fuel and oxidizer are then received by the engine for combustion.

In some embodiments, the extended expander cycle rocket engines use regenerative cooling to achieve both high thrust and durability. The engine's combustion chamber walls and engine nozzle walls are cooled by uncombusted fuel fed by a turbopump into a jacket or sleeve surrounding the chamber and nozzle. The fuel coming from the sleeve is cycled through the turbine side of the turbopump to serve as the driving medium for the pump. The expanded fuel emerging from the turbine side of the pump then passes into the combustion chamber injector for combustion with oxidizer in the combustion chamber. The cycle thus cools the walls of the combustion chamber and nozzle while converting a portion of the heat generated by the engine to a higher flow rate of fuel to the combustion chamber and hence a higher pressure the combustion chamber. The rest of the heat is used to preheat the fuel prior to having the fuel received by the engine's combustion chamber injector.

In industry today, when heat exchange occurs only at the boundary or outer layer or in cooling sleeves external to the engine, the amount of energy that can be acquired by the fuel on the coolant side is limited because of the limited surface area and the fact that excessive heat flux in the chamber can result in chamber failure. The present disclosure solves this limitation by implementing a plurality of heating and cooling channels throughout the engine and in various positions thereby increasing that surface area.

The most efficient heat exchange structures are those that provide the closest contact between the medium to be cooled and the coolant, i.e., the thinnest separating walls and the narrowest flow channels which provide the greatest surface area for heat transfer. Here, thanks to a 3D printed structure, the channels are within the engine and on the engine walls all built in one component rather than having channels as a separate element from the engine structure. This 3D printed design allows for the most efficient heat exchange in an expander cycle.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
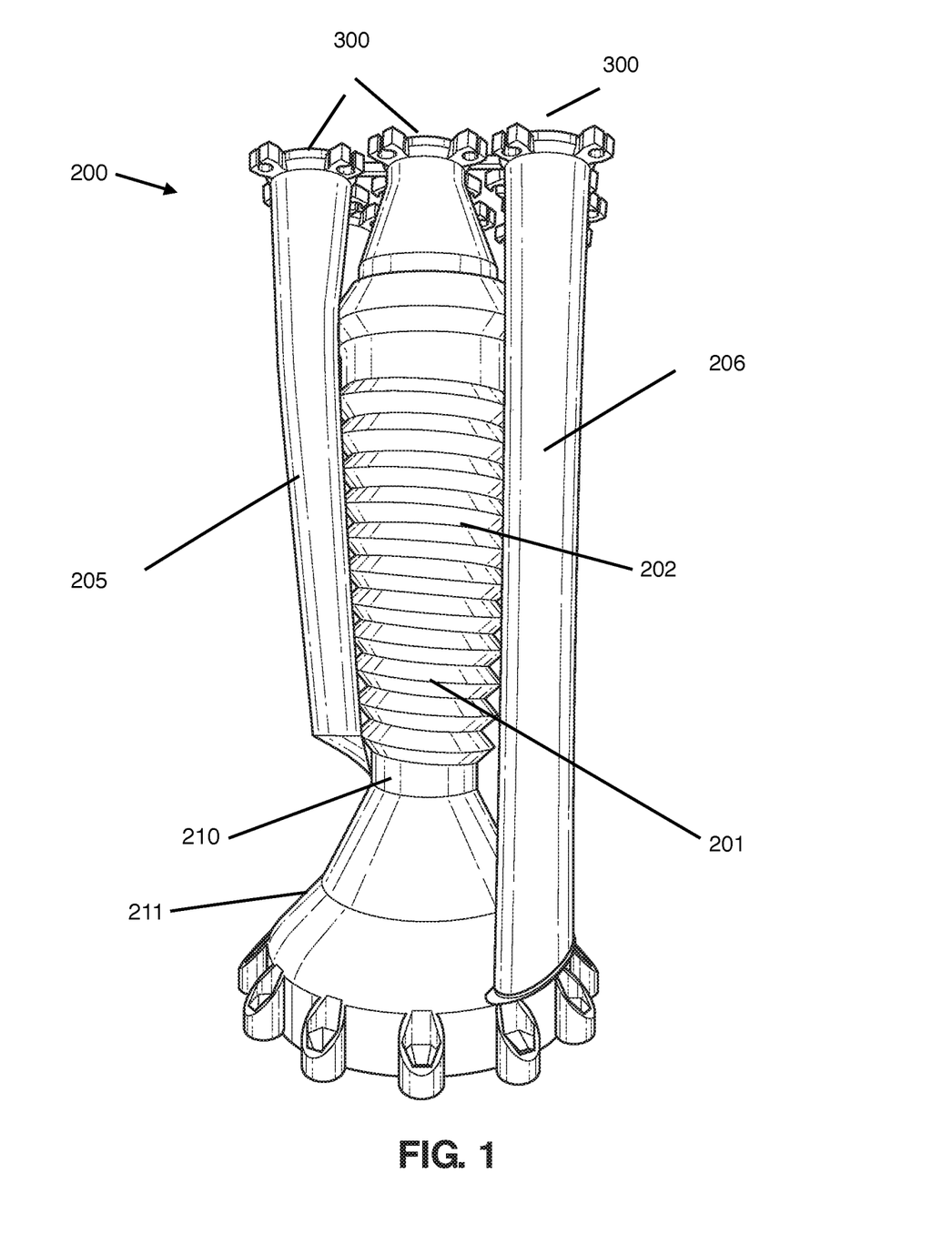
FIG. 1 is a side perspective view of a rocket engine system containing features of the present disclosure.
Figure 2:
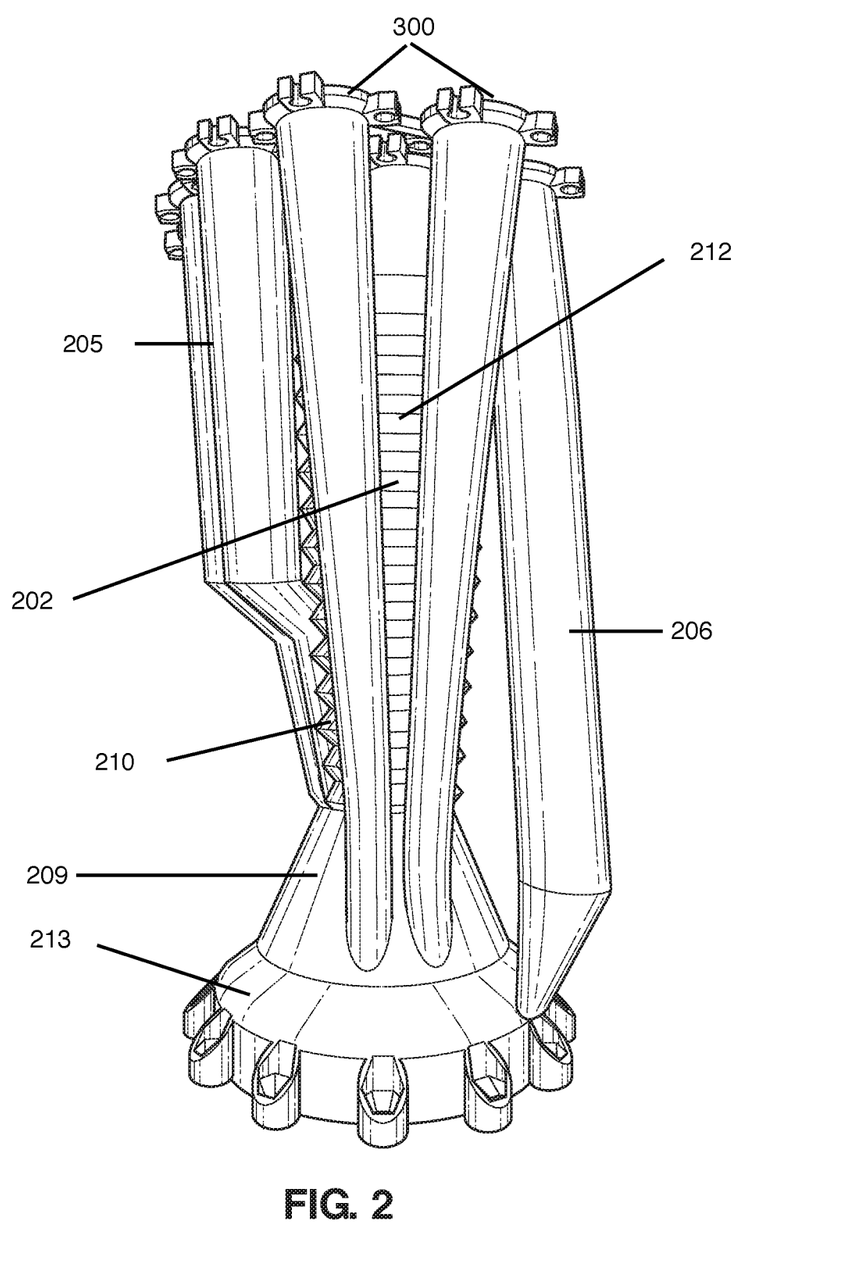
FIG. 2 is a side view of the rocket engine system.
Figure 3:
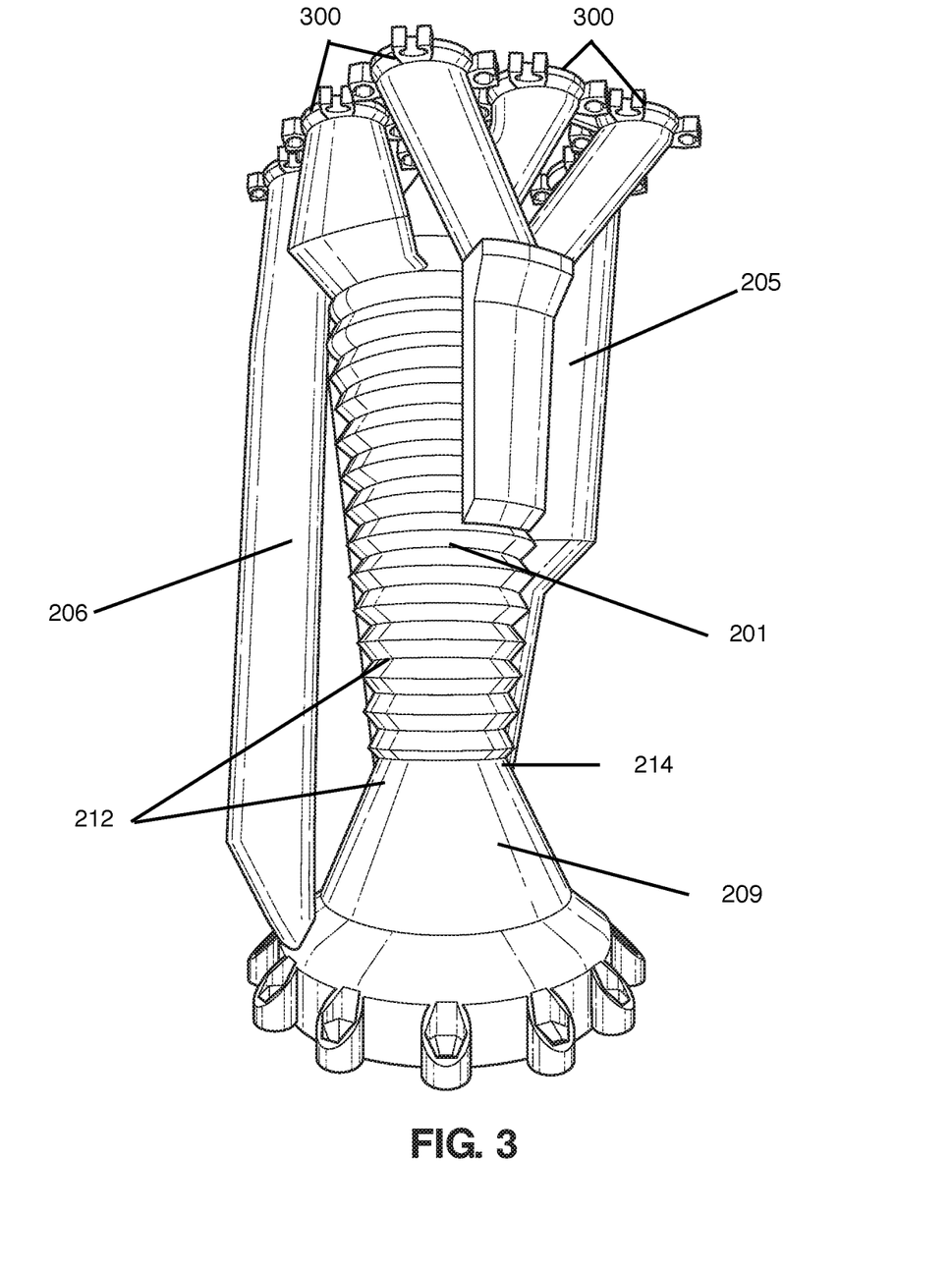
FIG. 3 is a perspective view of a rocket engine system showing oxidizer inlet and outlet.

Referring now to the drawings and the characters of reference marked thereon, FIGS. 1, 2 and 3 depict an embodiment of a rocket engine 200 and one-wheel turbopumps 300 according to the present disclosure. In FIG. 1, the rocket engine 200 includes a plurality of heating and cooling channels 201, one-wheel-turbopumps 300 disposed at the top of the rocket engine, an oxidizer inlet and outlet 205, a cooling sleeve 206. Coiled channels are disposed on the rocket engine outer surface. While this embodiment shows the one-wheel-turbopumps at the top of the rocket engine, in other embodiments the one-wheel turbopumps are placed on the sides of the rocket engines and in yet another embodiment, the one-wheel turbopumps are placed on top of the rocket engine and along the sides of the engine. The one-wheel turbopumps 300 on the side of the rocket engine 200 provide a more compact design than having the one-wheel turbopumps at the top of the rocket engine, while the one-wheel turbopumps on top of the rocket engine 200 provide a lesser compact design but allows for a lighter design thus reducing the weight of the system.

FIG. 1 also shows coiled channels 202 surrounding the rocket engine or outer surface of engine housing 210. Coiled channels can be added along the circumference of the engine as shown in a continuous manner, or in a discontinuous manner to surround various parts of the engine. In certain embodiments, the rocket engine is 3D printed making the channels 201 and 202 a structural and integral part of the rocket engine 200.

Figure 4:
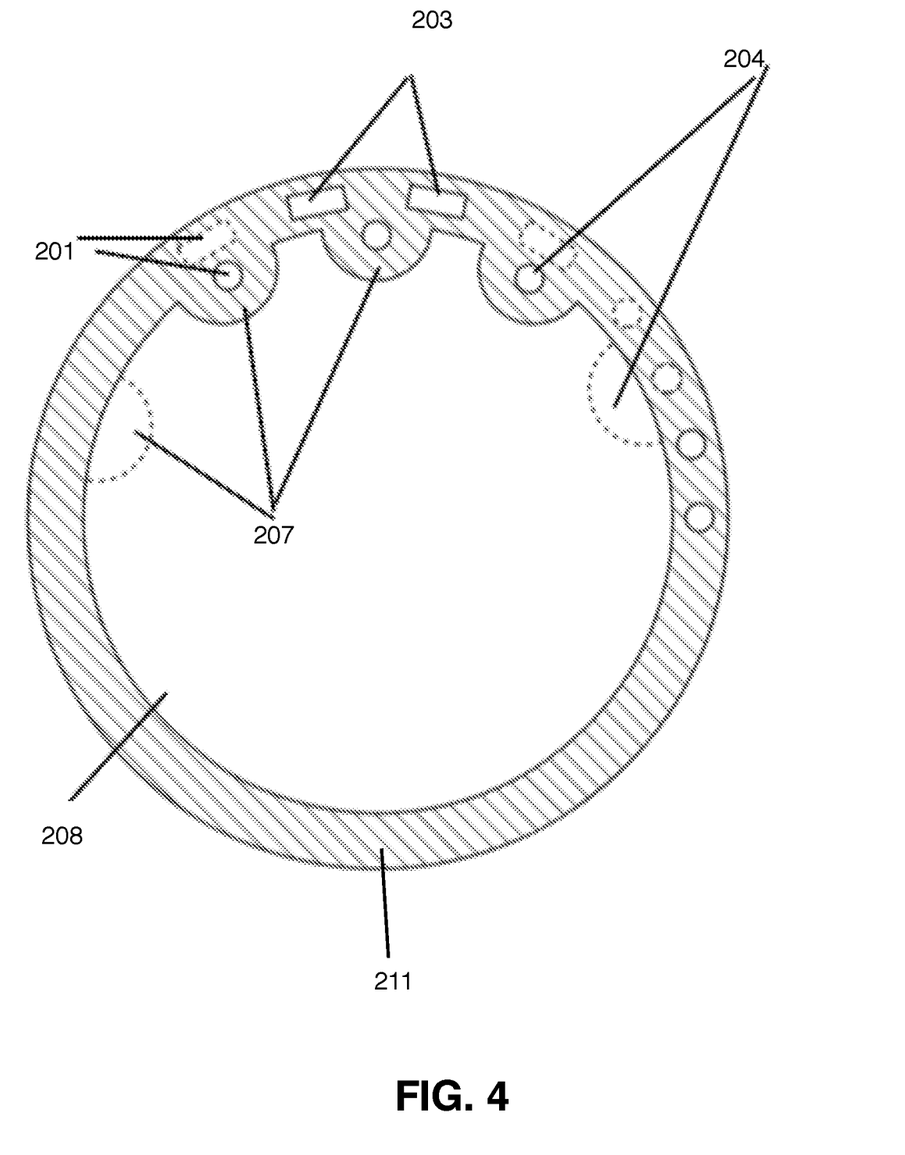
FIG. 4 is schematic cross-sectional illustration of a rocket engine embodiment.

FIG. 4 shows additional embodiments of the plurality of channels 201. In some embodiments, the heating and cooling channels are coiled channels on the outer surface of the engine. To add more heated surface, certain embodiments as shown in FIG. 4 comprise in wall channels 203, projection channels 204, or protruding channels extending from the inner or outer housing of engine. These projections or protrusions are sometimes circular in shape, rectangular or can be polygonal in shape.

In some embodiments, the extended expander cycle system includes a plurality of channels where the channels are coiled channels disposed on an outer surface of the rocket engine or coiled channels on an outer surface of the engine and also part of the engine, rather than being a structurally separated channel from the engine housing.

In other embodiments, the plurality of channels cooling and/or heating channels 201, are in wall channels 203 within the housing of the rocket engine. In yet another embodiment, the plurality of channels is radially extending projections or protrusions with openings 204 from the housing of the rocket engine allowing more heated surface 207. The internal openings inside the wall or inside the projections and protrusions can be of the same size or varying sizes.

In some embodiments, the channels are coiled channels 202 on an outer surface of the rocket engine 210, in wall channels 203 within the rocket engine housing 211 and radially extending projections 204 from the housing of the rocket engine 200, or a combination of various channel shapes. This combination of channels and utilization of a plurality of channels provides optimized heated surfaces within the rocket engine. The size, spacing and surface area of the channels is also variable and will be selected based on the heat needed for achieving the desired power as well as the cooling needs of the nozzle as governed by the nozzle dimensions, number of one-wheel turbopumps used and operating conditions. In fact, the present disclosure solves scaling issues of the expander cycle by extending the cycle through the use of a plurality of one-wheel-turbopumps and variable heating and cooling channels to accommodate the heat needed for achieving the desired turbines power as well as the cooling needs of the nozzle.

The channels 201 (i.e, cooling channels, heating channels, projection channels, protrusion channels, coiled channels, in-wall channel, openings, additional heated surface, etc), through which the coolant (the uncombusted fuel) passes are separate from those through which the combustion gas (the preheated fuel) passes, but the two types of channels are preferably immediately adjacent to each other to allow heat transfer between the combustion gas and the coolant. In some embodiment, the two groups of channels occupy different levels of the rocket engine housing while in other embodiments, they alternate with each other at the same level. In general, any arrangement or configuration that provides intimate contact can be used. The flow directions of the two groups may be co-current or counter-current. Other configurations and flow arrangements will be readily apparent to those skilled in the art.

The cooling sleeve (i.e cooling jacket, cooling sleeve, regeneratively cooling sleeve or jacket) 206 cools the walls of the main portion of the combustion chamber 212 and preferably extends also to the throat (smallest cross section of the nozzle 209) and the skirt 214 (the divergent portion of the chamber/nozzle assembly). Preferably, the sleeve itself consists of a plurality of individual channels. In some embodiments, the channels are limited to the periphery of the structure and contact only the combustion gas adjacent to the structure wall and flowing axially. The channels may themselves be axial or they may be spirally oriented, i.e., running at an angle to the projection of the chamber axis (centerline) on the chamber wall or rocket engine housing.

Figure 5:
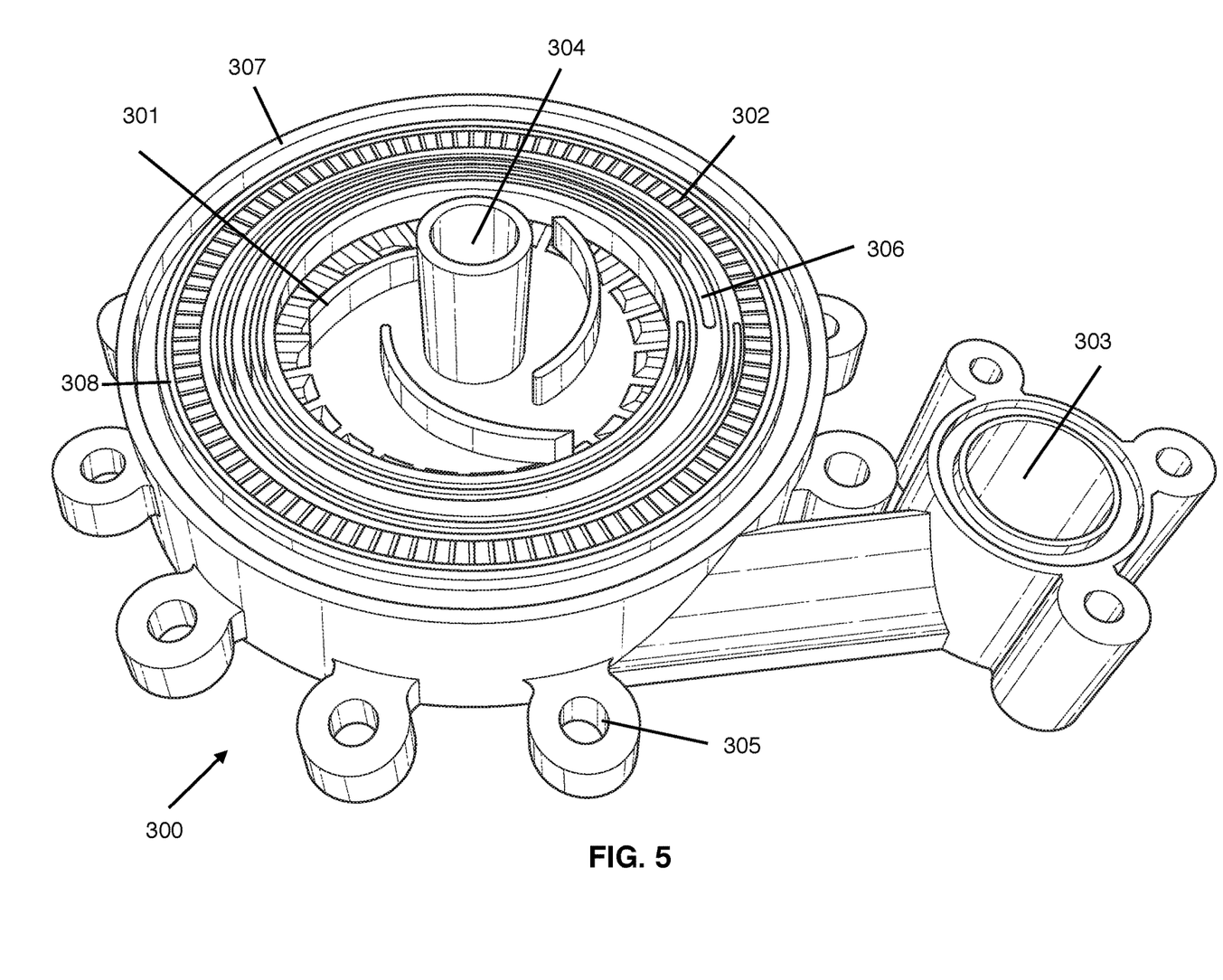
FIG. 5 is a perspective view of an embodiment of a one-wheel-turbopump.

FIG. 5 shows an example one-wheel-turbopump implementation 300 provided by the present disclosure. In this embodiment, the one-wheel-turbopump 300 includes a housing 307, a wheel 308 rotatable on the housing, a pump 301 (i.e one-wheel-turbopump pump portion, fuel pump, oxidizer pump, etc.) within the wheel and as a structural part of the wheel, a turbine 302 (i.e one-wheel-turbopump turbine portion, fuel turbine, oxidizer turbine, etc.) also within the wheel and as a structural part of the wheel, and a first conduit 303 (i.e. first fuel conduit, first oxidizer conduit, pump inlet/turbine outlet, pump outlet/turbine inlet, etc.) for fuel and oxidizer. The first fuel and oxidizer conduit 303 also serves as a pump inlet and a turbine outlet in this embodiment. The one-wheel-turbopump also includes a second conduit 304 (i.e. second fuel conduit, second oxidizer conduit, pump outlet/turbine inlet, pump inlet/turbine outlet, etc.) for fuel and oxidizer. The second conduit also serves as a pump outlet and turbine inlet, so the first and second fuel and oxidizer conduits are serving as pump and turbine inlets and outlets. Securing means 305 are coupled to the one-wheel-turbopump assembly, allowing a plurality of one-wheel-turbopumps to be coupled together. In some embodiments, the turbopumps can be stacked on top of one another, in other embodiments, a plurality of one-wheel-turbopumps can be attached to another either vertically, horizontally or a combination of vertical and horizontal attachments. In certain embodiments, the turbines and pumps are structurally coupled to the wheel portion of the one-wheel turbopump. A seal 306 separates the turbine from the pump side of the one-wheel-turbopump. While the shaft seal is common in the industry, the present disclosure reveals a preferred embodiment where the turbopump is shaftless or a one-wheel-turbopump design without a shaft to separate the turbine 302 and pump 301, and where both functions of the pump and turbine are combined in one wheel 308 instead of being separated by a shaft. This embodiment allows a plurality of one-wheel-turbopumps to be used together in one cycle either mechanically stacked or fluidly coupled. In some embodiments, the seal can be a mechanical seal, a shaft seal, a segment seal, a labyrinth seal, a floating ring seal or a combination thereof.

Generally, in industry today, the turbine, either impulse or reaction turbine is a separate component which extracts power from working fluid through a shaft separating the turbine from the pump and transfers power from that fluid to a centrifugal or axial pump. The present one-wheel-turbopump disclosure is applicable to impulse and reaction turbines, and to axial and centrifugal pumps as well and to various combinations of impulse and/or reaction turbines, and to axial and/or centrifugal pumps.

While FIG. 5 shows an embodiment where the pump 301 is closer to the center of the one-wheel-turbopump 300 and the turbine 302 is further away from the center of the one-wheel-turbopump and at the periphery of the wheel, in other embodiments, the pump 301 is at the periphery of the one-wheel turbopump whereas the turbine is closer to the center of the one-wheel-turbopump. This embodiment where the turbine is at the center of the one-wheel-turbopump and the pump on the periphery of the wheel works in conjunction with centrifugal forces allowing gas to be at the center of the one-wheel-turbopump assembly and liquid on the periphery to be pressurized by the pump located on the periphery.

The same one-wheel-turbopump can be used for processing both fuel and oxidizer, and the one-wheel-turbopump assembly does not need to be different for fuel and oxidizer. FIG. 5 shows a one-wheel-turbopump 300 embodiment where a fuel turbine 302 and oxidizer turbine 302 are an integral part of the one-wheel turbopump assembly, and specifically, a structural part of the wheel 308 portion of the one-wheel-turbopump assembly. A seal 306 is radially positioned between a pump and turbine and separates the turbine from pump allowing fluid separation.

The term fluid refers both to liquid and gases for fuel and oxidizer. Typically, expander cycle engines use cryogenic propellants so that when these propellants are heated they change from liquid-like fluids to gas-like fluids. Turbines very efficiently make use of gas-like fluids drive. For supercritical fluids in cooling channels, phase changes can be unpredictable, therefore, fluids is a more appropriate terminology. While the present disclosure is applicable to rocket engines that are powered by fluid, preferably liquid fuel and liquid oxidizer, the preferred engines are those that utilize liquid propane as the fuel and liquid oxygen as the oxidizer.

FIG. 5 shows securing means 305 on the one-wheel-turbopump. In this embodiment, the securing means are structurally coupled to the housing 307 of the one-wheel-turbopumps and allow multiple one-wheel-turbopumps to be attached together. While this embodiment allows for multiple one-wheel turbopumps to be attached together, other embodiments do not have any physical securing means. In those embodiments, a plurality of one-wheel-turbopumps can be fluidly coupled to one another.

FIG. 5 also shows a one-wheel-turbopump assembly where a first fuel conduit is coupled to the turbopump housing, that same conduit can serve as a first fuel conduit and first oxidizer conduit, and here is shown coupled to the housing and on the periphery of the one-wheel-turbopump assembly 300. In this embodiment, the first fuel conduit 303 is also a fuel pump inlet and a fuel turbine outlet and can also serve as an oxidizer pump inlet and oxidizer turbine outlet. This embodiment also shows a second fuel conduit 304 and second oxidizer conduit 304. The second fuel conduit 304 which can also be used as a second oxidizer conduit and also serves as a pump inlet and turbine outlet or a turbine inlet and pump outlet. In other embodiments, the first conduit 303 can be located at the center of the one-wheel-turbopump while the second conduit is at the periphery of the one-wheel-turbopump. The pump 301 can be a radial pump, a centrifugal pump, axial pump or a combination thereof, such as a combination of centrifugal and axial pump or just any other type of pump. The turbine 302 can be a radial turbine, an impulse turbine, a reaction turbine or a combination thereof such as a combination of both an impulse turbine and a reaction turbine, or any other type of turbine.

Thanks to the securing means 305, one-wheel-turbopumps are stackable and can be stacked either horizontally or attached vertically or in a diagonal manner. In another embodiment, the one-wheel-turbopump is 3-D printed with commonly used materials or manufactured using a 3 dimensional (3-D) printer.

It is worth noting that the same one-wheel turbopump can be used for fuel and/or oxidizer, making the pump 301, the same as a fuel pump and an oxidizer pump, and the turbine 302 be the same as a fuel turbine and oxidizer turbine. Similarly, the first and second conduit can be used for fuel and oxidizer, making the first conduit, first fuel conduit and first oxidizer conduit the same component. This clarification is used in the present disclosure for ease of read.

While the embodiment in FIG. 5 shows a pump 301 at the center of the one-wheel-turbopump and a turbine 302 at the periphery of the one-wheel turbopump, the pump can be located either inside or at the periphery of the one-wheel-turbopump, and the turbine is located either inside or at the periphery of the one-wheel-turbopump. In embodiments where turbine is inside the wheel portion of the one-wheel-turbopump, the pump is located at the periphery or outskirt of the wheel 308, and in embodiments where the pump is at the periphery or outskirt on the one-wheel-turbopump or the wheel portion thereof, the turbine is inside the wheel portion of the one-wheel-turbopumps.

The one-wheel-turbopump disclosed herein greatly simplifies turbomachinery. In addition, thanks to the fact that the one-wheel-turbopump is planar, shaftless, and includes both pump and turbine in the same wheel 308, a plurality of one-wheel-turbopumps can be used in the same cycle and system to achieve the required heat and energy levels. Unlike planar turbopumps known in the field, the current one-wheel-turbopump comprises both a pump and turbine as an integral part of the wheel portion of the one-wheel-turbopump rather than having a pump and/or turbine disposed on a rotating face of the turbopump.

When a plurality of one-wheel-turbopumps are used, either stacked on top of one another, fluidly coupled or coupled through mechanical means (such as fasteners, bolts, snapping mechanisms, locking mechanisms, threads, etc), additional channels are required to adequately heat and cool the system and to support the energy and heat supplied by the plurality of one-wheel-turbopumps. Energy and heat levels can be increased with additional channels and these channels can be either coils within the engine inside the engine housing or on the outer surface of the engine housing, on the nozzle, or surrounding a combustion chamber. As shown in FIG. 4, the channels can also be straight or curvy channels, can be in wall channels, or internal channels such as protrusions from inside the engine housing. These protrusions 204 with a through tube or channel allows for a larger surface area allowing for a bigger heated or cooled surface area to accommodate the heat and energy levels required by the system, and allow for the extended expander cycle system to scale unlike other expander cycles known in the art. The channels 201 can be used as heating or cooling channels. A combinations of various channel types can be used in certain embodiments.

Figure 6:
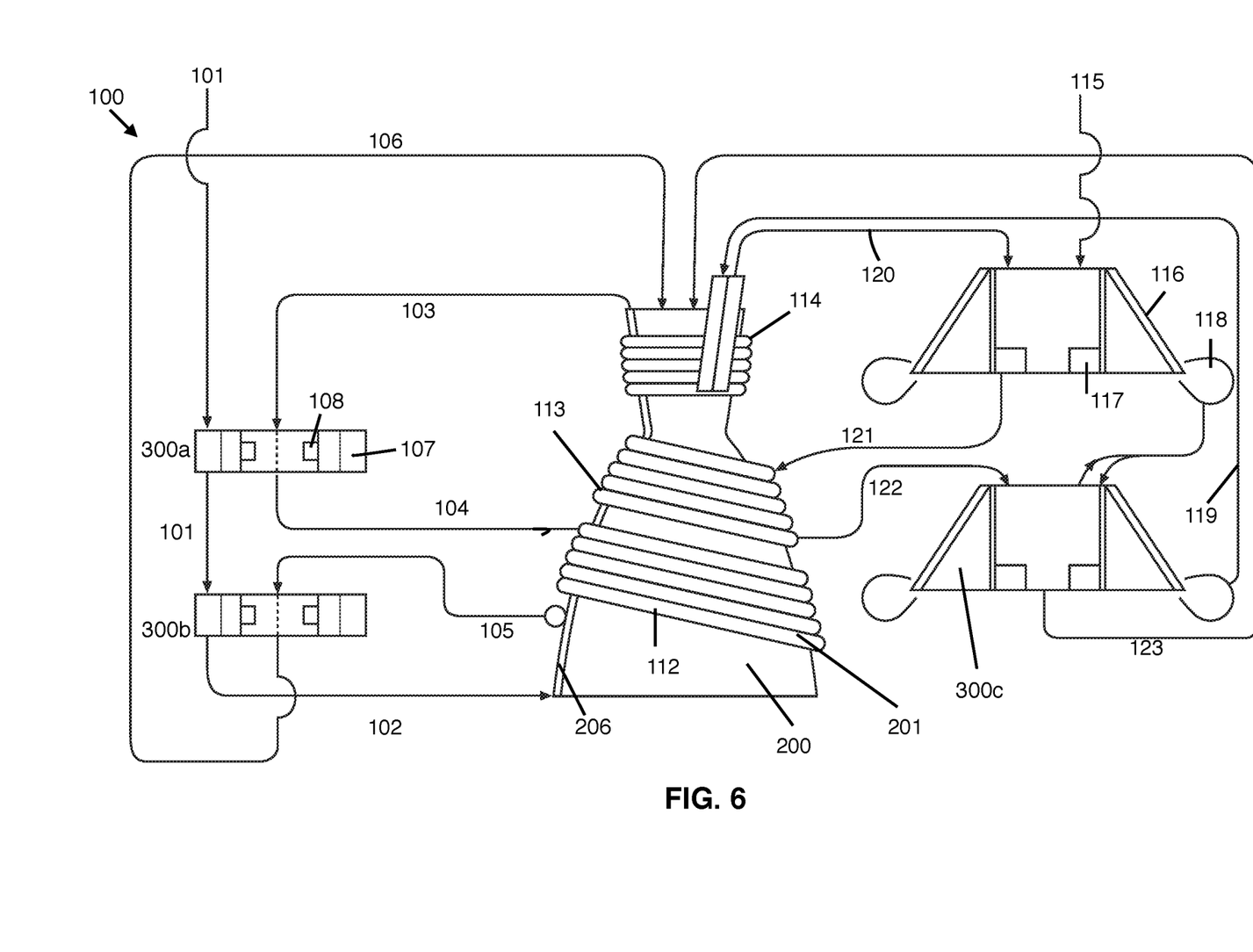
FIG. 6 is a schematic illustration of an extended expander cycle system.

In one embodiment of the present disclosure, the extended expander cycle system has two main subsytems: one for processing a fuel and another for processing an oxidizer before having the processed fuel and oxidizer delivered to a combustion chamber for combustion. The fuel supply and oxidizer supply are first processed through a plurality of fuel supplied one-wheel-turbopumps and a plurality of oxidizer supplied one-wheel-turbopumps before being heated and cooled through a plurality of channels. The processed fuel and processed oxidizer will either go through one or multiple cycles of this system or can only be processed once through either one or a plurality of one-wheel-turbopumps before being delivered to the combustion chamber for combustion. Here, a cycle is defined as fuel and oxidizer being processed through either one one-wheel-turbopump or through a plurality of one-wheel-turbopumps before being heated and cooled via a plurality of channels, and finally delivered to the combustion chamber. FIG. 6 shows other embodiments and variations of this cycle, and 300a and 300b show different embodiments of one-wheel-turbopumps 300.

In some embodiments such as the one depicted in FIG. 5, the one-wheel-turbopump includes a wheel 308 comprising one or multiple pumps 301, one or multiple turbines 302 and a seal separating the turbine and pump functions. In one embodiment, the pump portion of the one-wheel turbopump includes blades positioned at the same angle but different directions. For example, some blades on a pump are at 60-degree angle one way whereas other blades on the same pump are at a 60-degree angle in an opposite direction. In some embodiments, the pump blades are all of the same height and same angle/direction, whereas in other embodiments, the pump blades are of various height and same angle/direction, or of various heights and various angle/direction.

In some embodiments, the pump portion of the one-wheel turbopump is a centrifugal pump, including curvy blades. In operation of the centrifugal pump, as a fluid exits the pump blades, it takes on a large angular momentum. If pump vanes are provided in the one-wheel-turbopump housing, radially outward of the wheel, this momentum is removed by the vanes and converted to a rise in pressure. In conventional centrifugal pumping configurations, the height of the pump blades typically changes considerably across the rotating parts or rotor radius in a manner that corresponds to the increase in gas density that occurs through this path. In contrast, in the one-wheel-turbopump pump of the present disclosure, the axial and blade height can be held constant across the radius of the wheel, can be untapered, i.e., the heights of the blades can be constant across their length, can be stepped, or can change minimally. The flow area of the pump is instead changed substantially only by varying the blade thickness in the plane of the blades. As a result, the configuration is quite planar, with the axial height of the structure being much less than the diameter of the structure. Such an untapered, layered configuration enables ease of manufacture by microfabrication technologies such as 3D printing and integration with other microfabricated systems and electronics. In one example blade design in accordance with the present disclosure, the blade thickness, in the plane of the wheel, is tapered specifically to produce a blade shape that follows the path desired for flow streamlines through the pump or turbine. For example, the blades can follow log spiral streamlines.

In one embodiment, the one-wheel-turbopump includes a centrifugal pump and axial pump where the centrifugal pump is located closer to the center of the wheel and axial pump further away from the center. In other embodiments, the one-wheel turbopump includes either a centrifugal or axial pump.

For operation, the one-wheel-turbopump wheel 308 is rotatably mounted on the one-wheel-turbopump housing 307 in a manner that allows rotation of the wheel on the housing. Here, fluid directed to the turbine blades 302 along a path from the radial periphery of wheel causes the wheel 308 to rotate. Correspondingly, a fluid directed to the pump blades 301 at the wheel center is pumped along a path radially outward. FIG. 5 is a perspective view of the one-wheel-turbopump 300 in a housing 307 that accommodates journal and thrust bearings, described below, and that includes fluidic sealing surfaces providing isolated turbine and pump inlets and exits for enabling the turbine and pump paths respectively. In one embodiment, the fuel and oxidizer enter the pump through a first conduit or pump inlet 303 located on the periphery of the one-wheel-turbopump housing 307, the fluids are pressurized through the pump and exit the one-wheel-turbopump through a second conduit 304 or pump outlet. The same second conduit 304 also allows fluids to enter the turbine and serves as a turbine inlet where turbine gas goes from bottom to top, and where the liquid fuel and oxidizer are counterflowing to one another. In other embodiments, the fuel and oxidizer liquids and turbine gas counter-flow in the other direction where the gas goes along a path from top to bottom and liquids are counterflowing from bottom to top. The path of fluids and pump inlet and turbine outlet (or turbine inlet and pump outlet) is irrelevant so long as the pump incoming fluids and turbine outgoing fluids are counterflowing. Here, 3D printing and other methods of micromachining allow for both pump and turbine fluids to easily counterflow.

FIG. 5 depicts an embodiment where the first and second conduits are located in the one-wheel-turbopump housing. In another embodiments not depicted here, the pump inlet is located at the center of the wheel portion of the one-wheel-turbopump, such as the liquid (fuel or oxidizer liquid) enters from the center and back of wheel, get spun out in the openings of the pump and pushed out from the back of the pump. In yet another embodiment, the pump inlet is located on the periphery of the one-wheel-turbopump rather than the center of the one-wheel-turbopump assembly. In another embodiment, the center inlet is an inlet for the turbine where fluids enter the turbine through that turbine inlet and through the center of the one-wheel-turbopump assembly. Where a plurality of one-wheel-turbopumps are used in a system, the exhaust of one turbopump assembly is collected and sent to the next turbine.

With this design and operation, it is demonstrated that the one-wheel-turbopump assembly of the disclosure provides a turbine stage and a pump stage together on a single, common wheel, here employed for enabling centrifugal operation of both the turbine and the pump. No shaft or other mechanism is required to couple torque from a turbine rotor to a separate pump rotor; the torque generated by the turbine is directly applied to the pump by way of the common rotor. A centrifugal configuration for both the pump and the turbine enables support of the pump and rotor on a single, common wheel, and results in an elegantly simple turbopump design. In one embodiment, a turbine and pump are an integral part of the wheel rather than being disposed on a face and therefore both make up the configuration of the one-wheel-turbopump. Here, the turbine blades extend through the height of the wheel as shown in FIG. 5 rather than being turbine blades disposed on a side of the wheel or face of a rotor, thereby being an integral part of the wheel. Similarly, a pump and pump blades also extend through the height of the wheel rather than being pump blades disposed on a side or face of the wheel or face of a rotor, thereby being an integral part of the wheel.

The present one-wheel-turbopump assembly configuration is particularly well-suited for implementation of a micro-scale turbopump manufactured by, e.g., 3D printing or micromachining techniques. In accordance with the disclosure, 3D printing techniques can be employed to produce very high precision microturbomachine componentry. Beyond the precision enabled by this microfabrication processing, the economy of scale of microfabrication batch-processing results in the ability to very cost effectively produce large quantities of micro-turbopump componentry and microturbomachinery and assemblies. 3D printing of a one-wheel-turbopump in accordance with the present disclosure is enabled by and results in a planar, shaftless, configuration that is characteristic of 3D printing.

In one embodiment, the wheel 308 covers the inner portion of the housing 307. The housing includes securing means 305 inlets and outlets for the pump and turbine. In another embodiment, the first conduit is included in the one-wheel-turbopump housing is located at the periphery of that housing, while the second conduit is located at the center of the wheel and housing as shown in FIG. 5. In yet another embodiment, the first conduit is located inside the wheel and housing whereas the second conduit is located on the one-wheel-turbopump housing and at the periphery of the housing. The one-wheel-turbopump housing supported by bearings, such as radial journal bearings and forward and rear thrust bearings provided by the housing.

FIG. 6 shows a simplified schematic illustration of an extended expander cycle system 100 where a rocket engine 200 has a plurality of channels 201. Various types of one-wheel-turbopumps 300 are used in this embodiment. Through lines 101 and 115, fuel or oxidizer flow in from a tank (not shown here). The fuel coming from a tank is fed to lines 101 or 115 and is received by a fuel pump 301 through a first fuel conduit 303 and is pressurized through the fuel pump portion of the fuel supplied one-wheel-turbopump, exits the one-wheel-turbopump through a fuel pump outlet or second fuel conduit 304, then is transferred to a plurality of channels 201 for heating, goes through a fuel turbine inlet or fuel second conduit, gets processed by the fuel turbine or turbine portion of the fuel supplied one-wheel-turbopump and then goes to the rocket engine through the fuel turbine outlet or first conduit for fuel portion of the one-wheel-turbopump.

Similarly on the other side of the illustration, an oxidizer coming from a tank is fed to lines 101 or 115, then is received by an oxidizer pump 301 through a first oxidizer conduit 303 and is pressurized through the oxidizer pump portion of the oxidizer supplied one-wheel-turbopump, exits the one-wheel-turbopump through an oxidizer pump outlet or second oxidizer conduit 304, then is transferred to a plurality of channels 201 for heating, goes through an oxidizer turbine inlet or oxidizer second conduit, gets processed by the oxidizer turbine or turbine portion of the oxidizer supplied one-wheel-turbopump and then goes to the rocket engine through the oxidizer turbine outlet or first conduit for the oxidizer portion of the one-wheel-turbopump.

The plurality of channels 201 for both fuel and oxidizer provide adequate energy for fuel and oxidizer pressurization.

To operate, the engine needs fluids coming in at very high pressures. Fluids must come in to the engine at a higher pressure than the pressure of the combustion chamber, or otherwise flow backwards in an unwanted manner. In order to provide those adequate pressures, a fuel and oxidizer get pressurized separately through the pump portion of the one-wheel-turbopump. So fuel and oxidizer come in from a fuel and oxidizer supply and are put through the pump portion of the one-wheel-turbopumps separately to raise their pressure. On the fuel side, the pump discharge is routed through the cooling sleeve 206 or jacket 206. Typically, the main combustion chamber is cooled first and then, the now warmer fuel is used to cool the nozzle portion of the engine. The heat loads in the combustion chamber are significantly higher than those in the nozzle. The fuel exiting the cooling sleeve is now full of energy picked up from the process of cooling, is fed into the turbines portion of the fuel fed one-wheel-turbopump. The turbines are driven by the warm fuel and then the discharge or fuel coming out of the turbines is fed to the engine. Similarly, on the oxidizer side, the oxidizer of the oxidizer supplied one-wheel turbopump goes through the oxidizer pump portion of the one-wheel turbopump, exits the pump, goes through the cooling channels, then through the turbine and finally goes to the engine.

In some embodiments, the fuel and oxidizer go through multiple cycles before being fed to the engine for combustion as a final step. In some embodiments, the cycle can be repeated more than twice, and can go through a plurality of one-wheel turbopumps and plurality of channels multiple times before entering the engine for combustion. Unlike the prior art, in the present disclosure, both fuel and oxidizer are heated in the same engine.

FIG. 6 shows a simplified schematic of an extended expander cycle system 100 embodiment. In this embodiment, fuel or oxidizer are fed from a tank through a line 101 and through multiple one-wheel-turbopumps 300. The fuel or oxidizer then goes through a line 102 to regeneratively cooling sleeve 206 on the engine. The fuel or oxidizer then exits the cooling sleeve or jacket 206 through 103 for heated fuel or oxidizer through a first turbine, then back to a plurality of channels through 104 to reheating heat exchanger. The fuel or oxidizer then goes through 105 from reheating lines to a second turbine. The fuel or oxidizer then exists the second turbine from a turbine exhaust through line 106 to an injector and combustion chamber 212. In this embodiment, 107 shows a sample external axial pump blades being used and 108 shows an example of internal turbine blades in use in this cycle. 112 and 113 show spiral heat exchanger, a type of coil heating channels in this embodiment, whereas 114 shows a parallel heat exchanger or parallel heating channels.

On the other side of the schematic, fuel or oxidizer are supplied from a tank and go through a first one-wheel-turbopump 300. In this embodiment, the one-wheel turbopump includes an external centrifugal pump 116, internal turbine blades 117 and a manifold collector 118 here collecting the discharge of the pump. In this embodiment, the fuel or oxidizer goes from a tank to a first one-wheel-turbopump, then from a manifold on the first one-wheel-turbopump to a second one-wheel-turbopump for processing, and then from the pump portion of the one-wheel-turbopump to a heat exchanger or channel according to line 119, the fuel or oxidizer is then processed through the channels and goes from those channels or heat exchanger to a first turbine following line 120. The exhaust of the turbine then flows from the turbine to a second heat exchanger or second plurality of channels as shown by line 121. The discharge then goes from the second heat exchanger or plurality of channels to a second turbine portion of a second one-wheel-turbopump as shown by line 122, and the exhaust of the second turbine from the second one-wheel-turbopump goes to an injector and combustion chamber in the engine or rocket engine.

In some embodiments, a plurality of multistage centrifugal pumps are used, allowing for fuel and oxidizer to be pressurized by multiple pumps at the same time, and in a staged manner.

In certain embodiments, the engine is 3D printed allowing the heating and cooling channels and heat exchangers to be an integral part of the engine.

Where multiple one-wheel-turbopumps are used, extra heating and cooling channels are needed. These channels can be added throughout the engine, on the outer surface of the engine, on the inner surface of the engine or within the walls of that engine, and can take various shapes such as coils, spiral channels, parallel channels, through channels, or protrusions from the engine housing either inside or outside the engine. The present disclosure allows both fuel and oxidizer to be heated in the same engine.

In some embodiments, fuel and oxidizer go through multiple one-wheel-turbopumps (300a, 300b, etc.) before going into the system, whereas in other embodiments, the fuel and oxidizer go through one one-wheel-turbopumps, and then are fed to the system, and in yet another embodiment, the fuel and oxidizer go through one one-wheel-turbopump are processed through the channels and go into the same one-wheel-turbopump one or many more times before being fed to the combustion chamber for combustion.

In another aspect, the present disclosure, is embodied in a method of operating an extended expander cycle system where a fuel goes from a tank to the pump of a one-wheel-turbopump. The pump pressurizes the fuel and the fuel then gets heated through a plurality of channels or heat exchanger on or in a rocket engine. The fuel coming out of those channels then goes through the turbine portion of a one-wheel-turbopump and is then delivered to the engine for combustion. In some embodiments, the fuel goes through multiple pumps, multiple channels and multiple turbines before entering the engine for combustion. In other embodiments, the fuel goes through the same pumps and turbines of the one-wheel-turbopumps and through many cycles before entering the engine for combustion. Similarly, an oxidizer goes from a tank to the pump of a one-wheel-turbopump. The pump pressurizes the oxidizer and the oxidizer then gets heated or processed through a plurality of channels or heat exchanger on or in a rocket engine. The oxidizer coming out of those channels then goes through the turbine portion of a one-wheel-turbopump and is then delivered to the engine for combustion. In some embodiments, the oxidizer goes through multiple pumps, multiple channels and multiple turbines before entering the engine for combustion. In other embodiments, the oxidizer goes through the same pumps and turbines of the one-wheel-turbopumps and through many cycles before entering the engine for combustion. The present disclosure allows for both fuel and oxidizer to be processed in the same engine, instead of having fuel and oxidizer being processed through different engine or parts of engines.

In some embodiments, fuel and oxidizer are pressurized multiple times through either the same pump or a plurality of pump, get processed through a plurality of channels, and then processed multiple times through either the same turbine or multiple turbines, prior to being received the engine for combustion. In other embodiments, the fuel and oxidizer are processed through multiple one-wheel-turbopumps before being received by the engine for combustion.

In one embodiment, low pressure fuel and low pressure oxidizer enter the pump at a pressure about 40 PSI, the pump increases the pressure of the liquid fuel and oxidizer to engine operating pressure about 600 PSI, the fluid gets pressurized and now high pressure fluid goes through the heating channel on an engine surface. In this embodiment, two separate channels process fuel and oxidizer separately. These channels are on the same engine surface and can be close to one another as depicted in FIGS. 1 through 4. After the fluids are heated, the discharge of the channels drives the turbine portion of the one-wheel-turbopump assembly.

In practice, such engines will contain additional components such as valves, flow sensors, and pressure sensors and other flow control components or mechanisms, as well as additional pumps to assist in the staging of the oxygen feed, by-pass loops, and the like. The purposes and additional functions of these components will be readily apparent to those skilled in the art.

The foregoing description focuses on particular embodiments of the disclosure for purposes of explanation and illustration. Further embodiments and modifications of the above will be apparent to those skilled in the art upon reviewing this description, such embodiments and modifications falling within the scope of the disclosure as defined by the appended claims.

As mentioned above, other embodiments and configurations may be devised without departing from the spirit of the disclosure and the scope of the appended claims.

The invention claimed is:

1. An extended expander cycle system, comprising:
 a rocket engine having a plurality of channels;
 a plurality of fuel supplied one-wheel-turbopumps, each of said plurality of fuel supplied one-wheel-turbopumps comprising a fuel pump, a fuel turbine, a first fuel conduit, and a second fuel conduit,
 wherein a fuel is received by said fuel pumps via said first fuel conduit, pressurized through said fuel pumps of the fuel supplied one-wheel-turbopumps, transferred to said plurality of channels for heating via said second fuel conduit, transferred from said plurality of channels to said fuel turbines via said second fuel conduit, processed by said fuel turbines and transferred to said rocket engine via said first fuel conduit of said plurality of fuel supplied one-wheel-turbopumps; and a plurality of oxidizer supplied one-wheel-turbopumps each of said plurality of oxidizer supplied one-wheel-turbopumps comprising an oxidizer pump, an oxidizer turbine, a first oxidizer conduit, and a second oxidizer conduit, wherein an oxidizer is received by said oxidizer pumps via said first oxidizer conduit, processed through said oxidizer pumps of the oxidizer supplied one-wheel-turbopumps, transferred to said plurality of channels for heating via said second oxidizer conduit, transferred from said plurality of channels to said oxidizer turbines via said second oxidizer conduit, processed by said oxidizer turbines and transferred to said rocket engine via said first oxidizer conduit of said plurality of oxidizer supplied one-wheel-turbopumps;

wherein utilization of said plurality of channels for both said fuel and said oxidizer provides adequate energy for fuel and oxidizer pressurization.

2. The extended expander cycle system of claim 1, wherein said plurality of channels are coiled channels disposed on an outer surface of said rocket engine.

3. The extended expander cycle system of claim 1, wherein said plurality of channels are in wall channels within a housing of said rocket engine.

4. The extended expander cycle system of claim 1, wherein said plurality of channels are radially extending projections from a housing of said rocket engine.

5. The extended expander cycle system of claim 1, wherein said plurality of channels are coiled channels disposed on an outer surface of said rocket engine, in wall channels within a housing of said rocket engine and radially extending projections from said housing of said rocket engine, and wherein a utilization of said plurality of channels provides heated surfaces within said rocket engine.

6. The extended expander cycle system of claim 1 wherein both said fuel and said oxidizer are heated in same said rocket engine.

7. The extended expander cycle system of claim 1, wherein each fuel supplied one-wheel-turbopump of said plurality of fuel supplied one-wheel-turbopumps, comprises:
a housing;
a wheel rotatably mounted within said housing;
said fuel pump structurally coupled to said wheel;
said fuel turbine structurally coupled to said wheel;
a seal separating said fuel turbine from said fuel pump;
said first fuel conduit coupled to said housing serving as a fuel pump inlet and a fuel turbine outlet;
said second fuel conduit coupled to said housing serving as a fuel pump outlet and a fuel turbine inlet;
securing means coupled to said housing adapted to secure said plurality of fuel supplied one-wheel-turbopumps together.

8. The extended expander cycle system of claim 1, wherein each oxidizer supplied one-wheel-turbopump of said plurality of oxidizer supplied one-wheel-turbopumps comprises:
a housing;
a wheel rotatably mounted within said housing;
said oxidizer pump structurally coupled to said wheel;
said oxidizer turbine structurally coupled to said wheel;
a seal separating said oxidizer turbine from said oxidizer pump;
said first oxidizer conduit coupled to said housing serving as an oxidizer pump inlet and an oxidizer turbine outlet;
said second oxidizer conduit coupled to said housing serving as an oxidizer pump outlet and an oxidizer turbine inlet;
securing means coupled to said housing to secure said plurality of oxidizer supplied one-wheel-turbopumps together.

9. A method of operating an extended expander cycle system, comprising:
processing a fuel through a pump side of a one-wheel-turbopump, heating said fuel through a plurality of channels coupled to a rocket engine, processing said fuel through a turbine side of said one-wheel-turbopump, and delivering a processed fuel to said rocket engine for combustion,
processing an oxidizer through said pump side of said one-wheel-turbopump, heating said oxidizer through the plurality of channels coupled to the rocket engine, processing the oxidizer through said turbine side of said one-wheel-turbopump, and delivering a processed oxidizer to said rocket engine for combustion, wherein both fuel and oxidizer are heated in same said rocket engine.

10. The method of operating an extended expander cycle rocket engine of claim 9, wherein said fuel and said oxidizer are processed multiple times through said pump side, said plurality of channels, and said turbine side, prior to being received by said rocket engine for combustion.

11. The method of operating an extended expander cycle rocket engine of claim 9, wherein said fuel and said oxidizer are processed through a plurality of one-wheel-turbopumps prior to being received by said rocket engine for combustion.

* * * * *